Dec. 9, 1924.
O. PAWLOWSKI
1,518,163
AUTOMATIC TURRET LATHE
Original Filed July 17, 1920    7 Sheets-Sheet 1
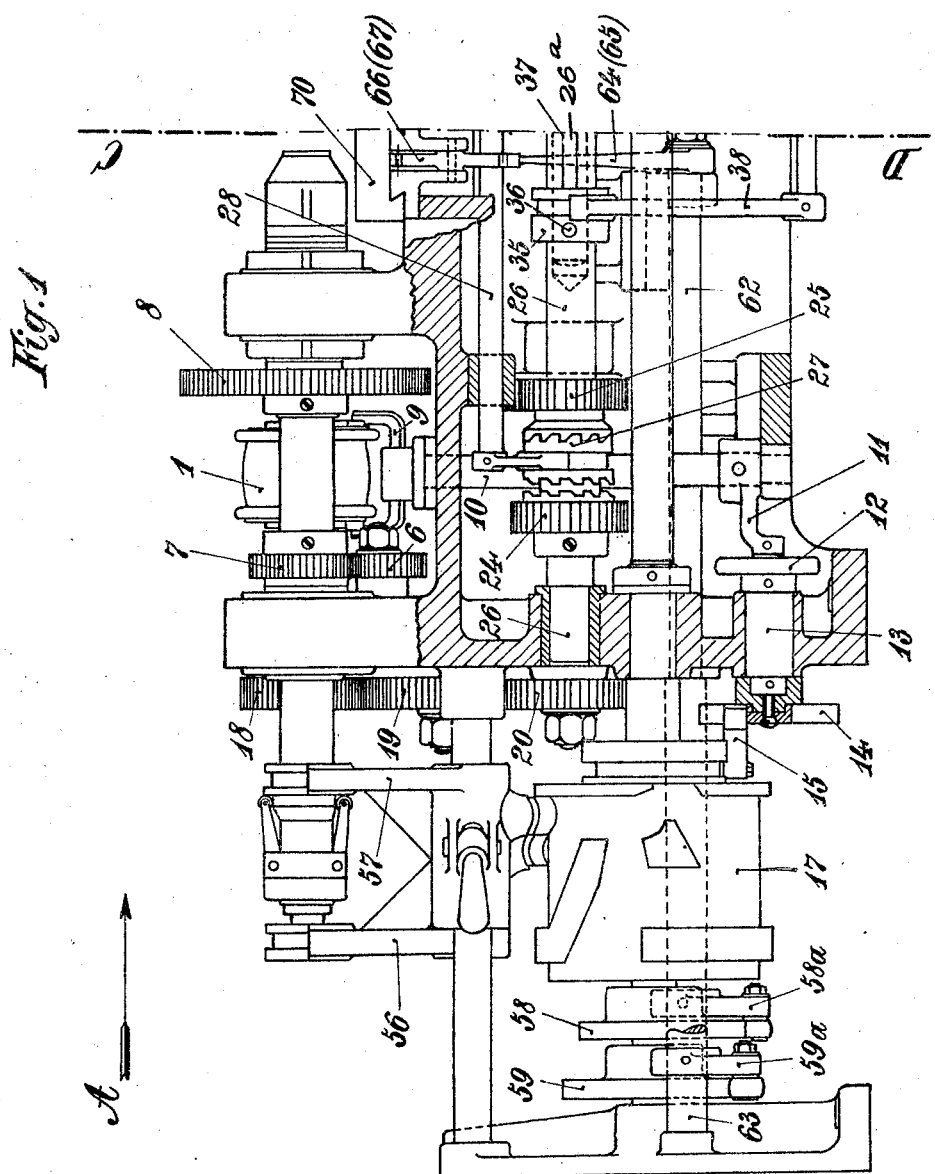
Inventor:
Otto Pawlowski

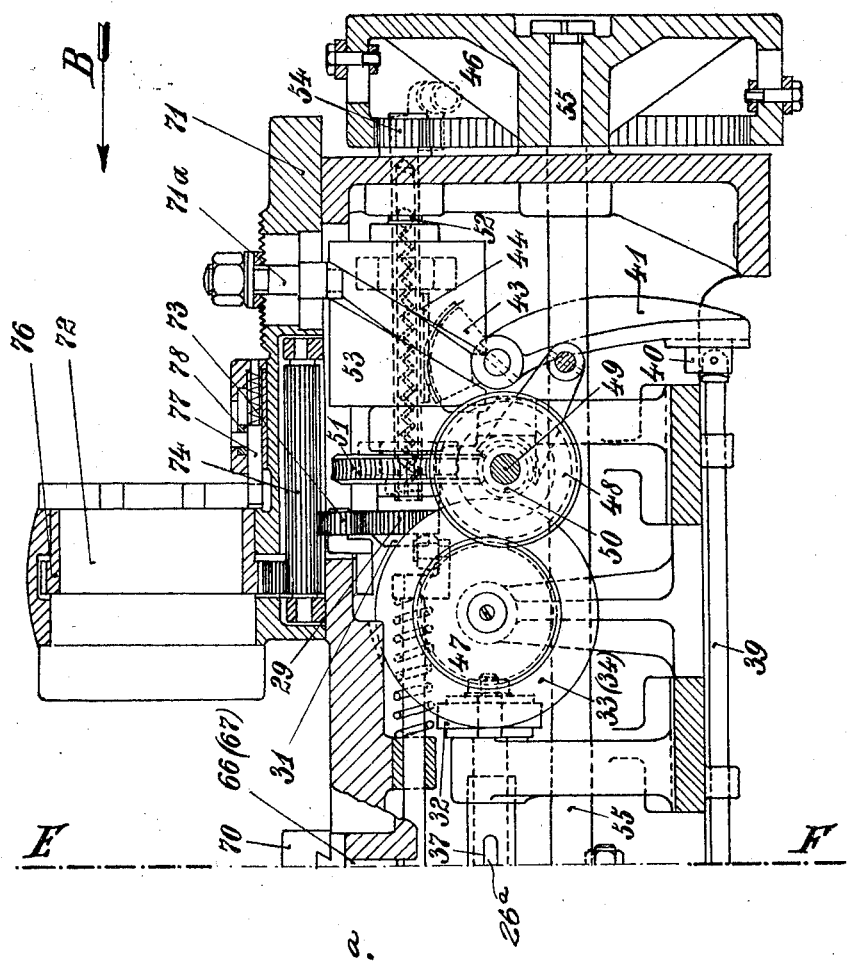

Dec. 9, 1924.　　　　　　　　　　　　　　　　　　　　　1,518,163
O. PAWLOWSKI
AUTOMATIC TURRET LATHE
Original Filed July 17, 1920　　　7 Sheets-Sheet 3
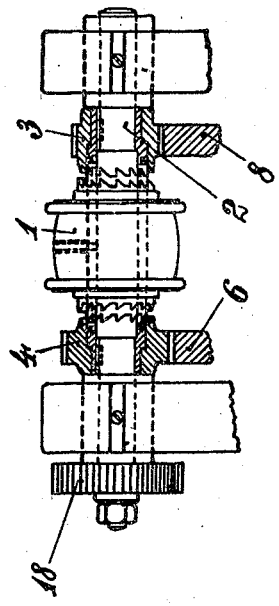
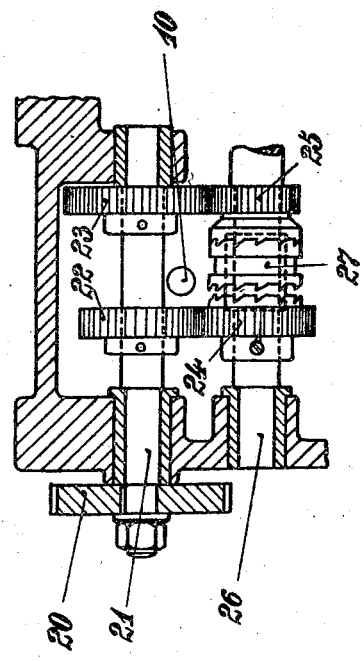
Inventor:
Otto Pawlowski Dec. 9, 1924.

O. PAWLOWSKI 1,518,163

AUTOMATIC TURRET LATHE

Original Filed July 17, 1920    7 Sheets-Sheet 4

Inventor:
Otto Pawlowski

Dec. 9, 1924.

O. PAWLOWSKI

AUTOMATIC TURRET LATHE

Original Filed July 17, 1920   7 Sheets-Sheet 5

1,518,163

Inventor:

Otto Pawlowski

Dec. 9, 1924.
1,518,163
O. PAWLOWSKI
AUTOMATIC TURRET LATHE
Original Filed July 17, 1920    7 Sheets-Sheet 6

Inventor:
Otto Pawlowski

Dec. 9, 1924.

O. PAWLOWSKI

AUTOMATIC TURRET LATHE

Original Filed July 17, 1920     7 Sheets—Sheet 7

1,518,163

Inventor:
Otto Pawlowski

Patented Dec. 9, 1924.

1,518,163

UNITED STATES PATENT OFFICE.

OTTO PAWLOWSKI, OF BERLIN, GERMANY.

AUTOMATIC TURRET LATHE.

Application filed July 17, 1920, Serial No. 397,133. Renewed March 24, 1924.

*To all whom it may concern:*

Be it known that I, OTTO PAWLOWSKI, citizen of the Republic of Germany, residing at Berlin SW., Germany, have invented certain new and useful Improvements in Automatic Turret Lathes (for which I have filed application in Germany on April 3, 1919, Patent No. 344,785, granted November 30, 1921), of which the following is a specification.

The present invention relates to automatic turret lathes and an important feature of the same is the provision of a compensating gear which enables the speed of the lathes to be varied within a wide range and which is provided in addition to the usual change speed gear. This compensating gear comprises a friction wheel which permits the speed, both during working and idle running, to be varied in accordance with the dimensions of the work and the material of which it is composed. In consequence of this invention, the operations of the lathe are more efficiently carried on, the time for each operation being exactly that which is necessary for the highest degree of efficiency. The usual speed change gear for working and idle running with its invariable rates of speed and the friction gear for compensating the speeds are disposed in one single train of gearing, which is driven by a single shaft and transmits through the controlling shaft for the turret to the main controlling shaft. The latter produces, then, by means of a cam disc, the adjustment of the friction gear in the gear train. The reversing of the change gear is performed under the control of the feed gear for the turret by means of a special cam thrust gear.

In the accompanying drawing a constructional form of the invention is shown by way of example.

Fig. 1 is a longitudinal section through the left-hand half of the lathe.

Fig. 1ª is a longitudinal section through the right-hand half of the lathe.

Fig. 2 is a vertical section through the pulley drive.

Fig. 3 is a section along line 3—3 in Fig. 1, seen from the right.

Figs. 7–10 show detail parts of the lathe.

Figure 6:
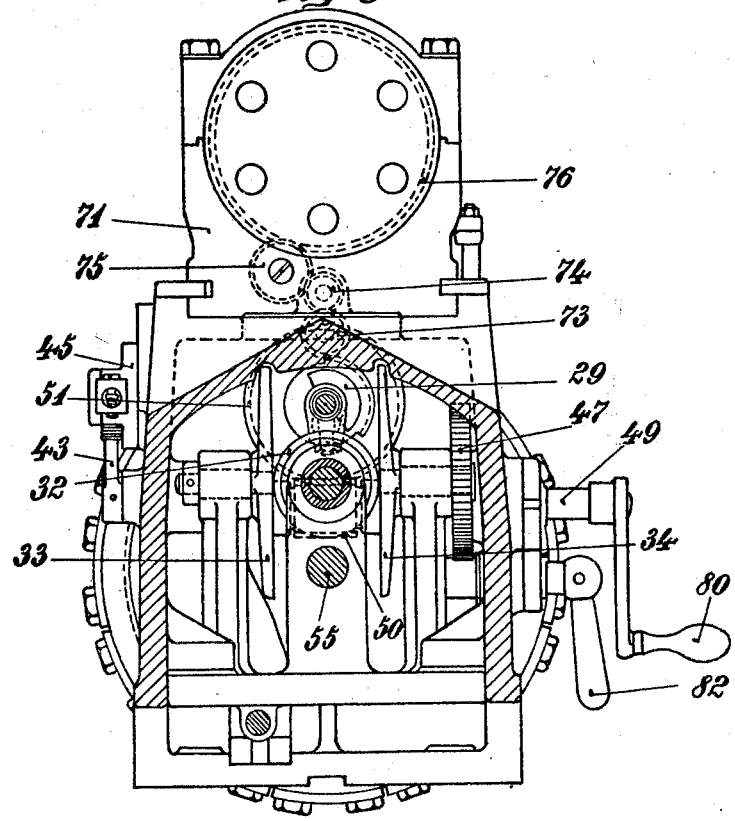
Fig. 6 is a section on the line 3—3 in Fig. 1 as seen from the left.

All operations of the turret lathe are controlled by the main controlling shaft 55 which extends longitudinally of the machine. The power for driving this controlling shaft is derived from a single belt pulley 1, which is shiftably mounted on a shaft 2, Fig. 2. The shaft 2 transmits its rotation by means of gear wheel 18 and gear wheel 19 to gear wheel 20 on a countershaft 21, Fig. 10. This countershaft 21 transmits its rotation either by spur gears 22, 24 at a ratio 1:1, or by spur gears 23, 25 at a ratio 1:2 to a shaft 26, according to whether a splined toothed clutch 27 on shaft 26 is engaged with gear 24 or 25, respectively. The free end of shaft 26 is bored to serve as a bearing for a shaft 37, which is coupled to the shaft 26 to rotate therewith by means of a pin 36 secured thereto and extending through a longitudinal slot 26ª in the shaft 26. The pin 36 is secured to a grooved ring 35 by means of which the shaft 37, which is freely shiftable relatively to the shaft 26, may be shifted. This shifting of the shaft 37 in the shaft 26 is accomplished by means, hereinafter described, acting on a fork 38 engaging the grooved ring 35. On the free end of shaft 37 is fitted a friction disc 32. The friction disc 32 engages and drives another friction disc 34, and is guided by a corresponding counter disc 33, see Fig. 6. On the shaft of friction disc 34 is rigidly mounted a spur gear 47, which meshes with and drives a spur gear 48. This spur gear 48 drives a shaft 49 which, by means of a worm 50 and a worm wheel 51 drives a shaft 52. Outside of the frame of the lathe, a small gear 54 is mounted on said shaft 52 and meshes with internal teeth of the cam drum 46, driving the latter thereby. The said cam drum 46 is rigidly fixed on the main controlling shaft 55.

It will be noted that the above train of connections between the pulley 1 and the controlling shaft 55 includes a gear shift having two speeds and a frictional drive of universally variable speed.

For cutting (low speed) the gears 22, 24 (Fig. 10) for the ratio 1:1 are engaged. This is done by means of a push rod 28 (Fig. 1), which, at one end acts on the clutch 27, and, at its other end, bears with an antifriction roller against a lug 31 of a gear segment 29, rigidly fixed on a shaft 52.

For the accelerated idle run the push rod 28 engages the gears 23, 25 at the ratio of 1 : 2.

Figure 1:
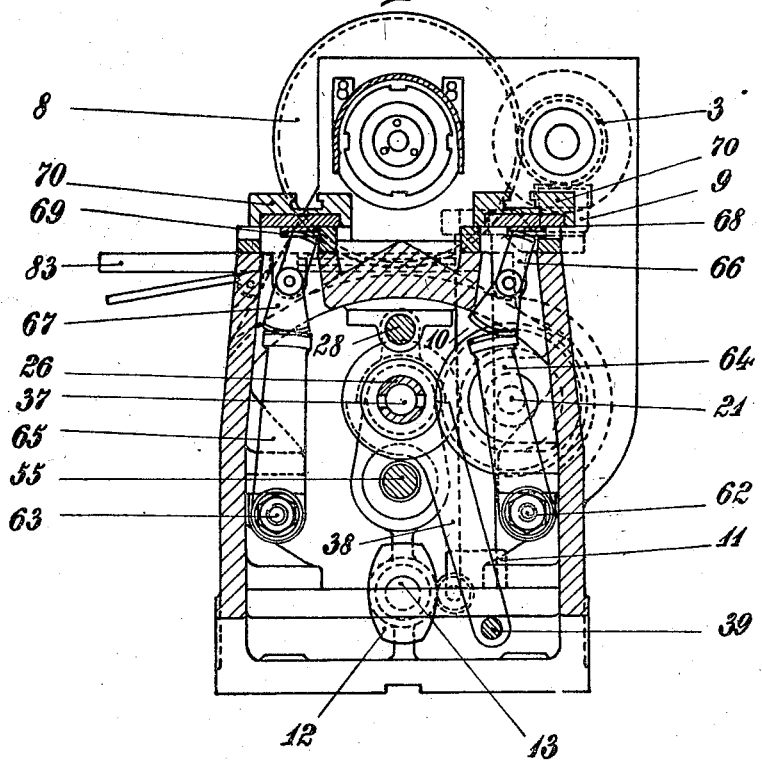
Figure 5:
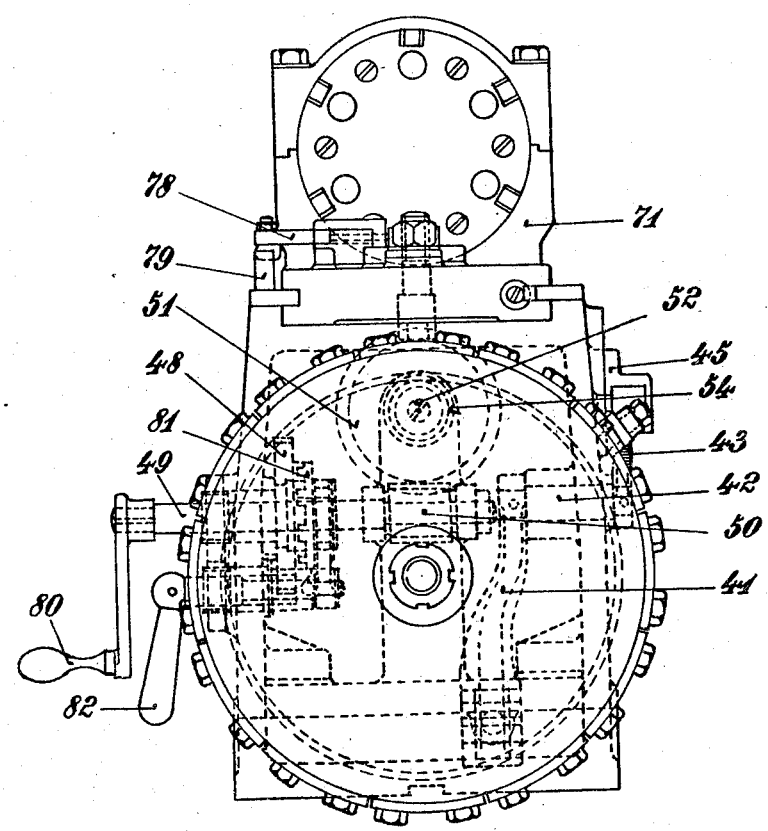
Fig. 5 is a right end view of the lathe.
Figure 7:
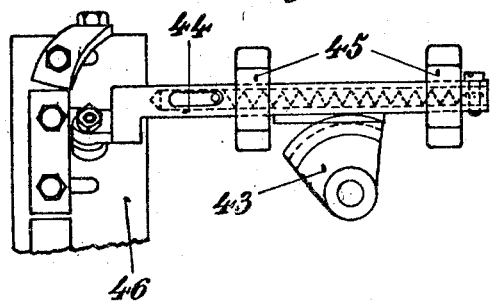

The movement of the friction roller 32 between friction discs 33, 34 is produced by cam disc 46 as follows:

A connecting rod 44 (Fig. 7) the under side of which is formed as a rack and which is guided in bearings 45, is resiliently positioned against cam drum 46. The rack is in engagement with a tooth segment 43 which is journaled on a rod 42 (Fig. 5). The other end of the rod 42 carries a lever 41, the free end of which is connected through a slot 40 with a push rod 39 (Fig. 1). By means of the fork 38 the rod 39 engages in collar 35, which connects the shafts 26 and 37. A movement of connecting rod 44 by means of the cam disc, inwardly or outwardly, as seen in Fig. 1, results in the movement of friction roller 32 toward the center and toward the periphery of friction disc 33, 34.

The turret head 72 is operated by means of cam drum 53 on shaft 52 and is turned, during the accelerated idle running of the lathe, in the following manner:

The gear segment 29 on shaft 52 is coupled by a pinion 73 with a gear cylinder 74, which transmits its rotation by means of an intermediate gear 75, (Fig. 6) to the toothed flange 76 of the turret head 72. The turret head is locked by means of a dog 77 (Fig. 1ᵃ) which is released by a lever 78, when the turret is being turned (Fig. 5), and the free end of which lever abuts during its return against an adjustable lug 79.

The slide 71 of the turret head 72 is adjustable relatively to the cam drum 53. This is rendered possible by a bolt 71ᵃ, which carries the guide roller for the cam cylinder 53 and passes through a slot in the slide.

Figure 8:
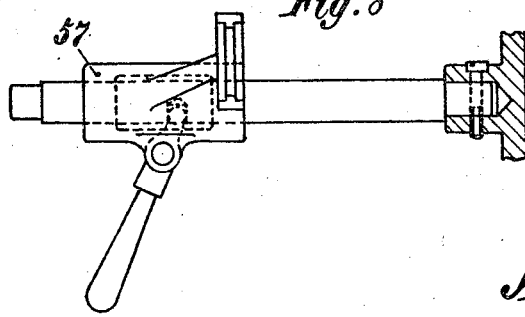
Figure 9:
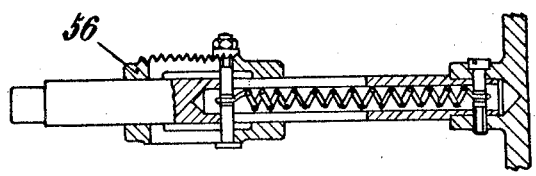

The feed of the stock and the holding of the stock is secured by means of a cam drum 17, which is likewise fixed on shaft 55. The feed is effected during the accelerated withdrawal of the turret by means of the sliding shoe 56 (Figs. 1 and 9), the clamping of the material immediately after the feed by means of cam drum 17, by aid of the sliding shoe 57 (Figs. 1 and 8).

Figure 4:
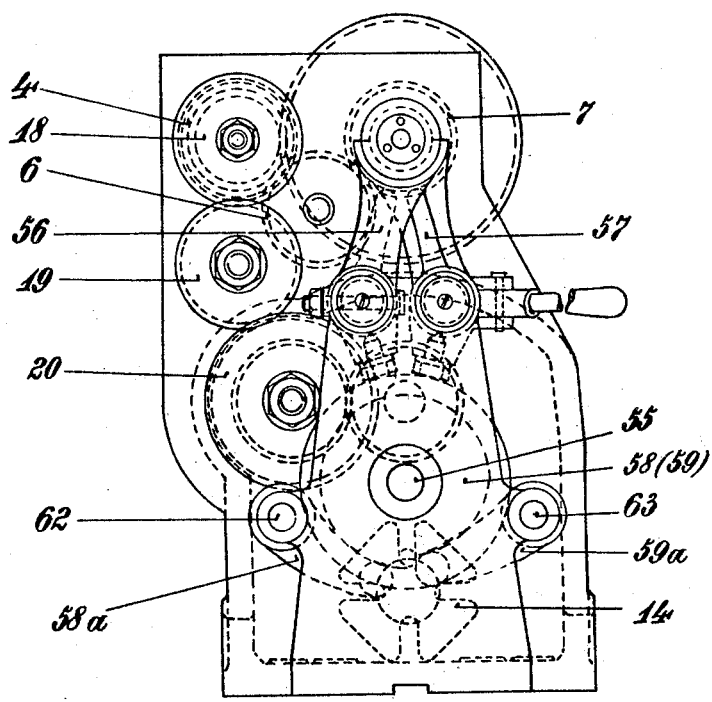
Fig. 4 is a left end view of the lathe.

The operating of the cutting off slides 70 is also effected by shaft 55 with aid of the cam discs 58 and 59. These cams oscillate, by means of levers 58ᵃ and 59ᵃ, respectively, (Fig. 4) the shafts 62 and 63, said oscillation being transmitted by segment levers 64 and 65 (Fig. 3) at the other end of shafts 62, 63 to the double segment levers 66 and 67. The latter are in engagement with the racks 68 and 69 of the slides 70.

The mandril is driven from the pulley 1, for the slow or cutting speed by means of gears 3 and 8, and for the idle or feed speed by means of gears 4, 6, 7 (Figs. 1–4). The changing is effected by means of a fork 9, which is journalled on a shaft 10. At the lower end of shaft 10 is fitted a lever 11, which bears with a roller against an elliptic disc 12. The shaft 15 of said elliptic disc (Figs. 1 and 3) carries at its other end a Maltese cross 14 (Figs. 1 and 4) which is operated by lugs 15 on the cam drum 17. These lugs are disposed in a T-groove in the drum, in which they may be adjusted. Their number depends on the number of turns required.

All operations are derived from the main controlling shaft 53 with the exception of the operation of the turret which is derived from the shaft 52 immediately in front of it. As the shafts 52 and 55 are driven from shaft 26, and the latter has only two separate and invariable speeds, according to whether the gears 22, 24 for the low working run, or the gears 23, 25 for the high, idle run are engaged, all operations would, consequently have only the two invariable speeds of the working and the idle runs, respectively. According to the length of the piece of work, and its hardness and facility of being cut, it may, however, be desirable and of advantage, to be able to employ higher or lower speeds, both while cutting and during the idle run and it is the object of the hereinbefore mentioned friction gear 32, 33, 34 to provide for the possibility of such compensation of the speeds. The nearer the friction disc 32 is moved to the periphery of the discs 33, 34, the slower the said discs 33, 34, or the shafts 52 and 55, will be driven, and when the disc 32 is located nearer the center, the said shafts will be driven at a higher speed. It is, thus, possible, by shifting the friction disc 32, to adjust the best suited speed for any condition of work.

For setting up the machine, the crank handle 80 is provided, which is journalled on a shaft 49 (Fig. 5). A toothed clutch 81, likewise fitted on shaft 49, and releasable by a handle 82, allows of disengaging the gear 48, so that by means of crank 80, it will be possible to adjust the cam disc 46 over the worm 50, the worm wheel 51 and the shaft 52.

The machine is stopped by means of hand lever 83 (Fig. 3), which allows of disengaging a clutch between the belt fork 9 and the shaft 10, to hold the belt fork 9 and move it into its intermediate position.

I claim:

1. In an automatic turret lathe, the combination of a main drive shaft; a change speed gear for driving said main drive shaft at different speeds for cutting and idle running; a turret; a controlling shaft for the turret; a variable speed, friction gear between the main drive shaft and the turret controlling shaft; a main controlling shaft; and a cam device mounted on the main controlling shaft and effecting the adjustment of the variable speed friction gear.

2. An automatic turret lathe as described in claim 1 in which the variable speed friction gear comprises a positively driven driving disk and a friction plate engaged by the same, and in which a shaft on which the driving disk is mounted is slidably mounted in the main driven drive shaft, a pin and slot connection being provided between the shafts and the pin carrying a groove collar by means of which the driving disk and its shaft is moved to vary the speed at which the friction plate is rotated by the driving disk.

3. In an automatic turret lathe, the combination of a main drive shaft; a change speed gear for driving said main shaft at different speeds for cutting and idle running; a turret; a controlling shaft for the turret; a main controlling shaft; a variable speed friction gear between the main shaft and the main controlling shaft; and a cam device operated by the main controlling shaft for effecting the adjustment of the variable speed friction gear.

4. In an automatic turret lathe, the combination of a main drive shaft; a change speed gear for driving said main shaft at different speeds for cutting and idle running; a turret; a controlling shaft for the turret; a main controlling shaft; and a variable speed friction gear between the main drive shaft and the turret controlling and main controlling shafts.

5. In an automatic turret lathe, the combination of a main drive shaft; a change speed gear for driving said main shaft at different speeds for cutting and idle running; a turret; a controlling shaft for the turret; a main controlling shaft; a variable speed friction gear between the main drive shaft and the turret controlling and main controlling shafts; and means movable simultaneously with the main controlling shaft for effecting the adjustment of the variable speed friction gear.

6. In an automatic turret lathe, the combination of a main drive shaft; a change speed gear for driving said main shaft at different speeds for cutting and idle running; a turret; a controlling shaft for the turret; a main controlling shaft provided with a cam; and means comprising a universally variable change speed device and controlled by the cam on the main controlling shaft for automatically effecting variations of speed of the latter.

7. In an automatic turret lathe, the combination of a drive shaft; change speed gearing therefor comprising a driving shaft, gears secured thereto, companion gears mounted loosely on the drive shaft and a clutch member splined on the driving shaft and adapted to engage either of said gears loosely mounted thereon; a variable speed friction drive operated by said drive shaft; a turret controlling shaft operated by said friction drive; a main control shaft; a drum mounted on said main control shaft and driven from said turret controlling shaft; and means on said drum effecting the setting of the variable speed friction drive in accordance with a predetermined plan.

8. An automatic turret lathe as described in claim 7 in which the variable speed friction drive comprises a shiftable shaft and a friction wheel carried thereby, the drive shaft being provided with a hollow end in which the shiftable shaft may slide, the drive shaft and the shiftable shaft having a pin-and-slot connection.

9. An automatic turret lathe as described in claim 8 in which the automatic setting of the variable speed friction gear is effected by means of a grooved collar carried by the shiftable, friction wheel carrying shaft, a fork engaging said grooved collar, a rod on which the fork is mounted, an arm for operating said fork, a segment secured to said arm, and a slidably mounted rack meshing with said segment; and means on said drum for effecting such movement comprising a plurality of adjustable cams, said cams engaging the end of the rack.

10. An automatic turret lathe as described in claim 7 in which there are means for controlling the working and idle running positions of the clutch member which means comprises a toothed segment, a turret head controlling shaft on which said segment is mounted, a cam on said toothed segment and a shifter engaging the clutch member and said cam.

11. An automatic turret lathe as described in claim 7 in which the means on said drum for effecting the setting of the variable speed friction drive comprises a plurality of individually adjustable cams the adjustment of which is universally variable within predetermined limits.

In testimony whereof I have affixed signature.

OTTO PAWLOWSKI.